(12) United States Patent
Yoshimi

(10) Patent No.: US 10,836,079 B2
(45) Date of Patent: Nov. 17, 2020

(54) PIPING STRUCTURE OF TIRE VULCANIZER, CIRCULATOR, AND METHOD FOR VULCANIZING TIRE WITH TIRE VULCANIZER

(71) Applicant: ROCKY-ICHIMARU Co., Ltd., Fukuoka (JP)

(72) Inventor: Naofumi Yoshimi, Fukuoka (JP)

(73) Assignee: ROCKY-ICHIMARU CO., LTD., Chikugo (JP)

( * ) Notice: Subject to any disclaimer, the term of this patent is extended or adjusted under 35 U.S.C. 154(b) by 292 days.

(21) Appl. No.: 15/528,463

(22) PCT Filed: Jan. 14, 2015

(86) PCT No.: PCT/JP2015/050752
§ 371 (c)(1),
(2) Date: May 19, 2017

(87) PCT Pub. No.: WO2016/113853
PCT Pub. Date: Jul. 21, 2016

(65) Prior Publication Data
US 2017/0320243 A1 Nov. 9, 2017

(51) Int. Cl.
*B29C 35/04* (2006.01)
*B29C 33/04* (2006.01)
*B29D 30/06* (2006.01)

(52) U.S. Cl.
CPC .............. *B29C 35/04* (2013.01); *B29C 33/04* (2013.01); *B29D 30/0654* (2013.01);
(Continued)

(58) Field of Classification Search
CPC ....... B29C 35/04; B29C 33/04; B29C 35/049; B29C 35/045; B29D 30/0662;
(Continued)

(56) References Cited

U.S. PATENT DOCUMENTS

2006/0012076 A1* 1/2006 Caretta ................. B29C 35/007
264/326
2011/0180958 A1* 7/2011 Goumault .............. B29C 33/04
264/236

(Continued)

FOREIGN PATENT DOCUMENTS

JP        03-215010 A    9/1991
JP   2006110738 A  *  4/2006
(Continued)

OTHER PUBLICATIONS

KR101247631 Machine translation of Description.*
"Connected" definition from Merriam-Webster.*
JP-2006110738-A Machine Translation of Description.*

*Primary Examiner* — Christopher T Schatz
*Assistant Examiner* — Cynthia L Schaller
(74) *Attorney, Agent, or Firm* — Heedong Chae; Lucem, PC

(57) ABSTRACT

An example of a piping structure of a tire vulcanizer to which the present invention is applied has a central mechanism 1 of the tire vulcanizer as illustrated in FIG. 1. The central mechanism 1 has a bug head 2, a hydraulic cylinder 3, and exhaust circulation path pipes 4. In addition, the central mechanism 1 has a bladder (not illustrated) which may be expanded and contracted as a vulcanizing medium is supplied into the bladder. One end of the exhaust circulation path pipe 4 is connected to an interior of the bladder, and the two exhaust circulation path pipes 4 are connected to each other through a bypass pipe 5. The other end of the exhaust circulation path pipe 4 is connected to an exterior of the central mechanism 1.

4 Claims, 8 Drawing Sheets

(52) U.S. Cl.
CPC ........ *B29D 30/0662* (2013.01); *B29C 35/045* (2013.01); *B29C 35/049* (2013.01); *B29D 2030/067* (2013.01); *B29D 2030/0667* (2013.01)

(58) Field of Classification Search
CPC ........ B29D 30/0654; B29D 2030/0667; B29D 2030/067
See application file for complete search history.

(56) References Cited

U.S. PATENT DOCUMENTS

2013/0062803 A1\* 3/2013 Mizuta ............... B29D 30/0601
264/40.1
2013/0105361 A1\* 5/2013 Salazar ................... C10C 3/002
208/80

FOREIGN PATENT DOCUMENTS

| | | | |
|---|---|---|---|
| JP | 2008-195058 | A | 8/2008 |
| JP | 2011-079147 | A | 4/2011 |
| JP | 2012-122381 | A | 6/2012 |
| JP | 2012-166404 | A | 9/2012 |
| JP | 2013-000922 | A | 1/2013 |
| JP | 2013-159049 | A | 8/2013 |
| KR | 101247631 | \* | 3/2013 |

\* cited by examiner

[Fig. 1]
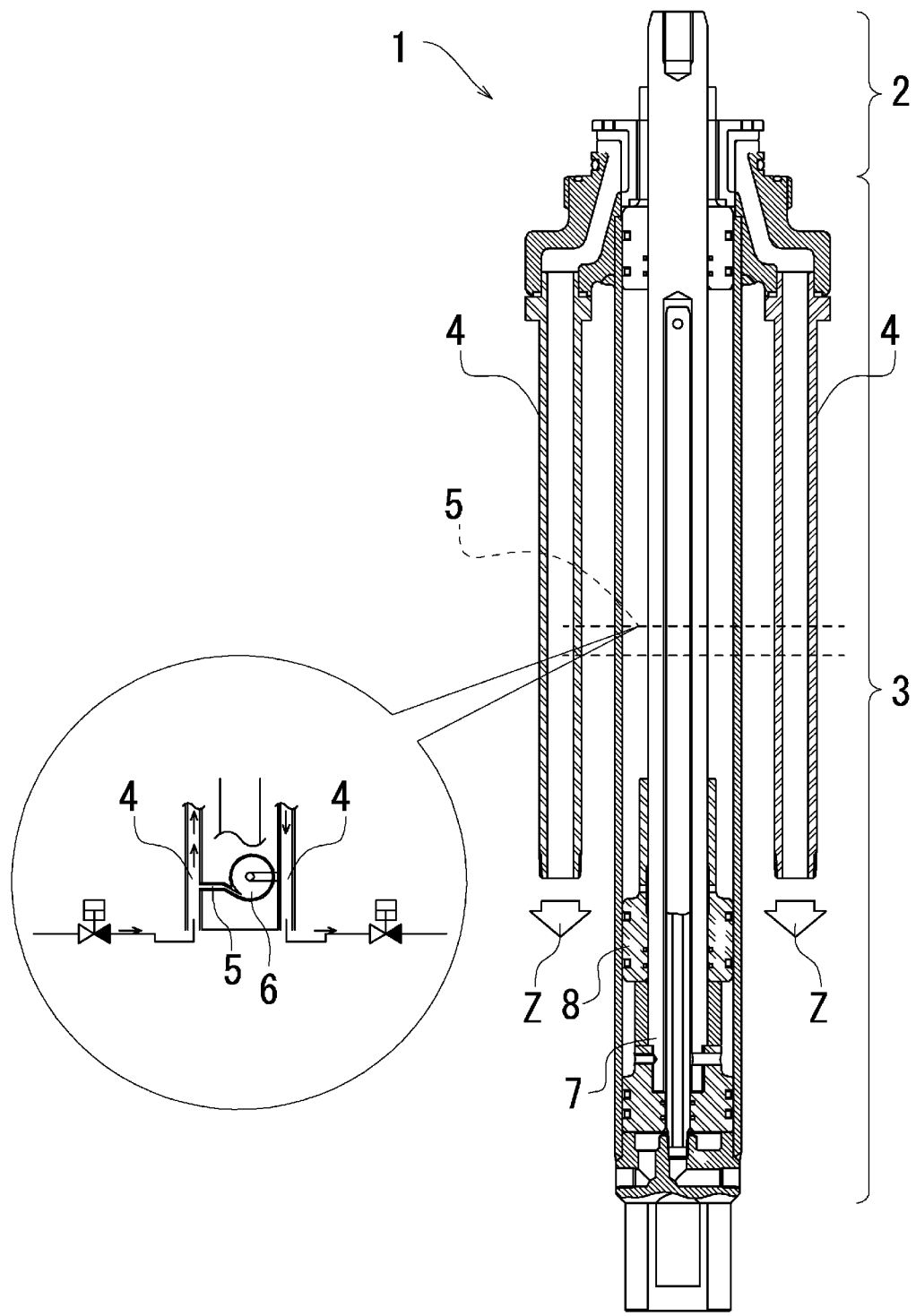

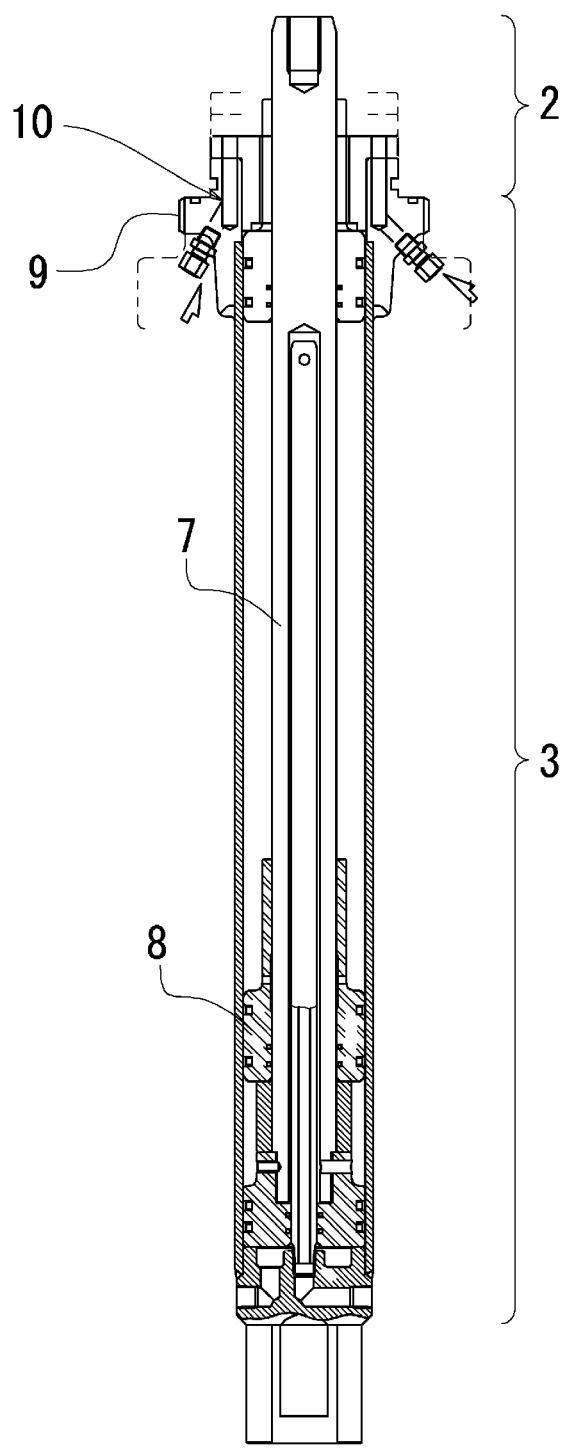
[Fig. 2]

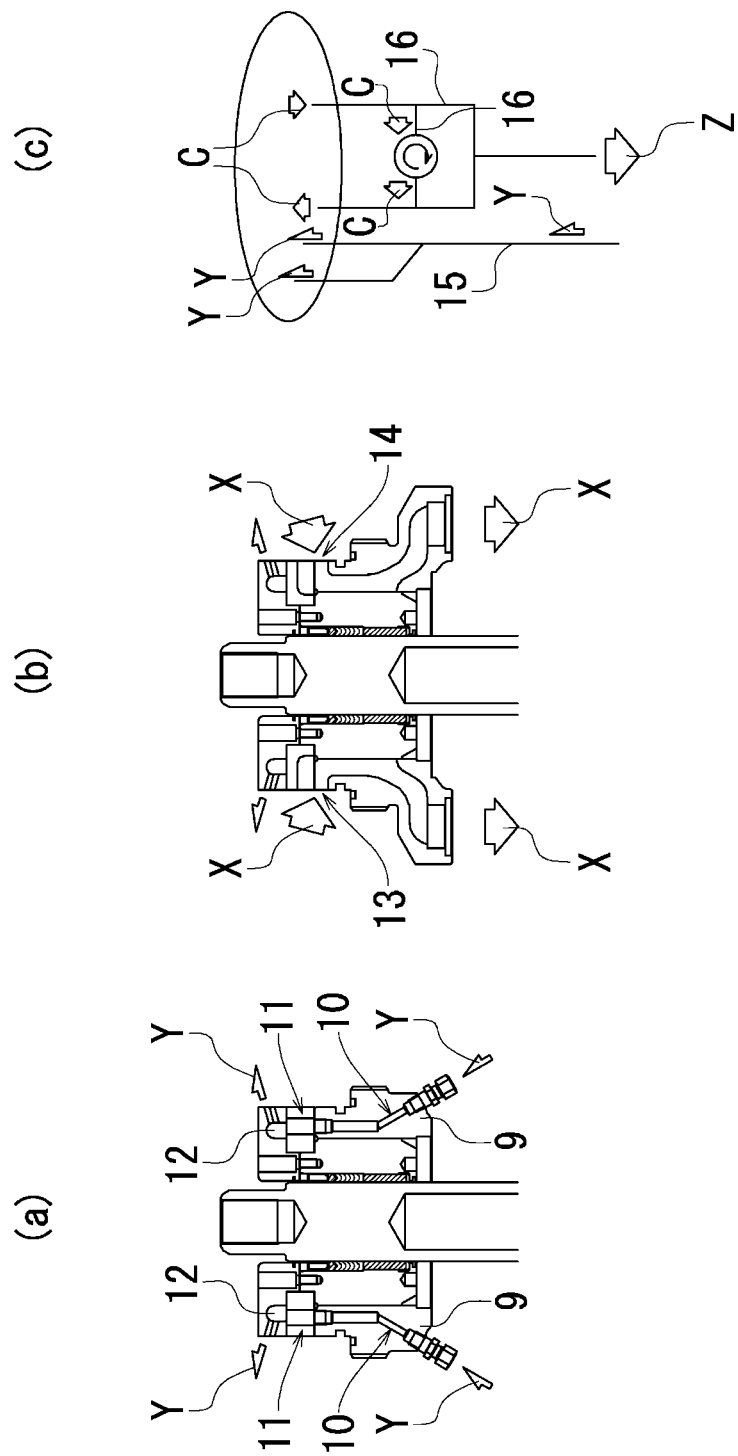
[Fig. 3]

[Fig. 4]
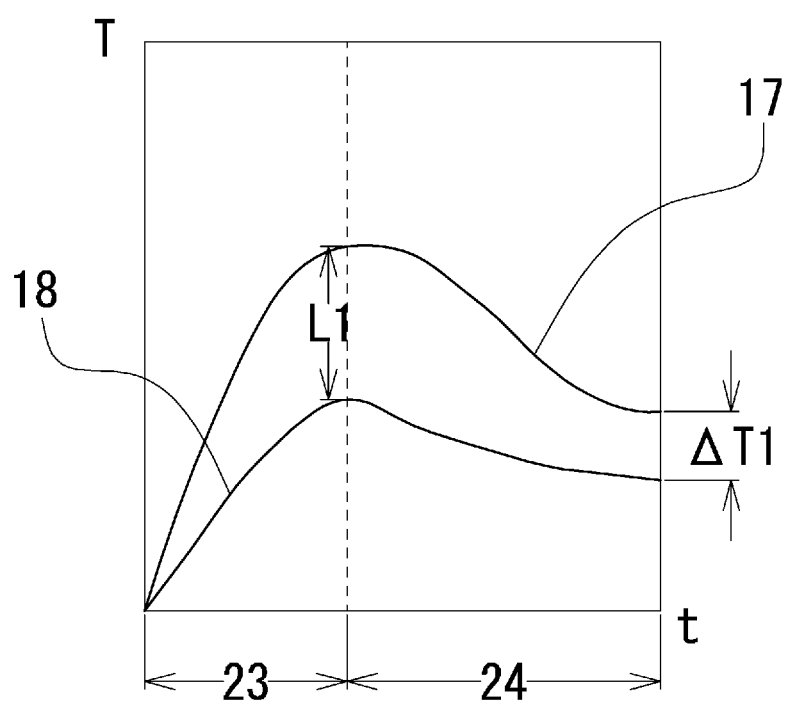

[Fig. 5]
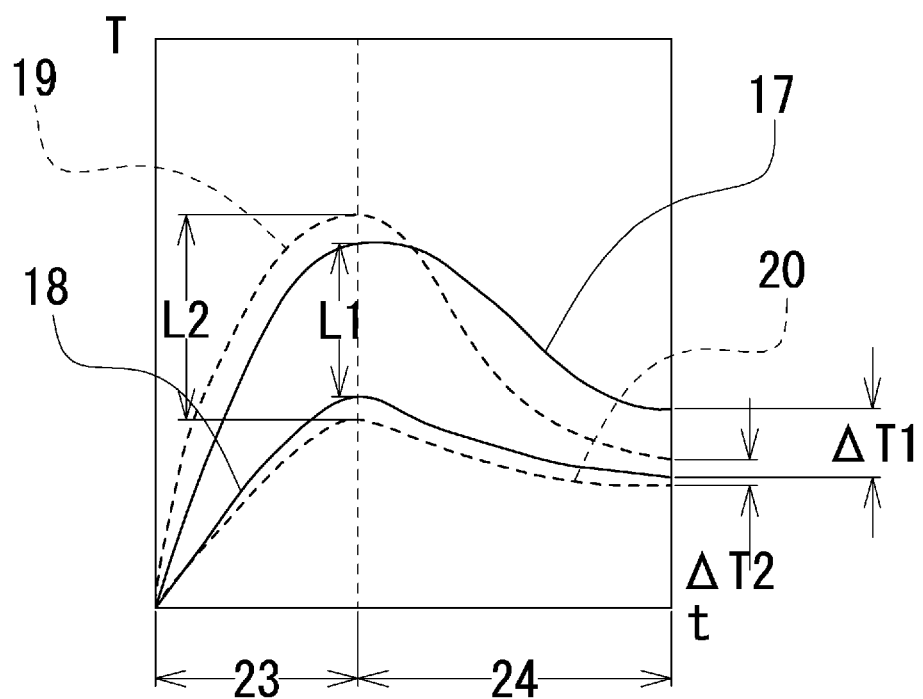

[Fig. 6]
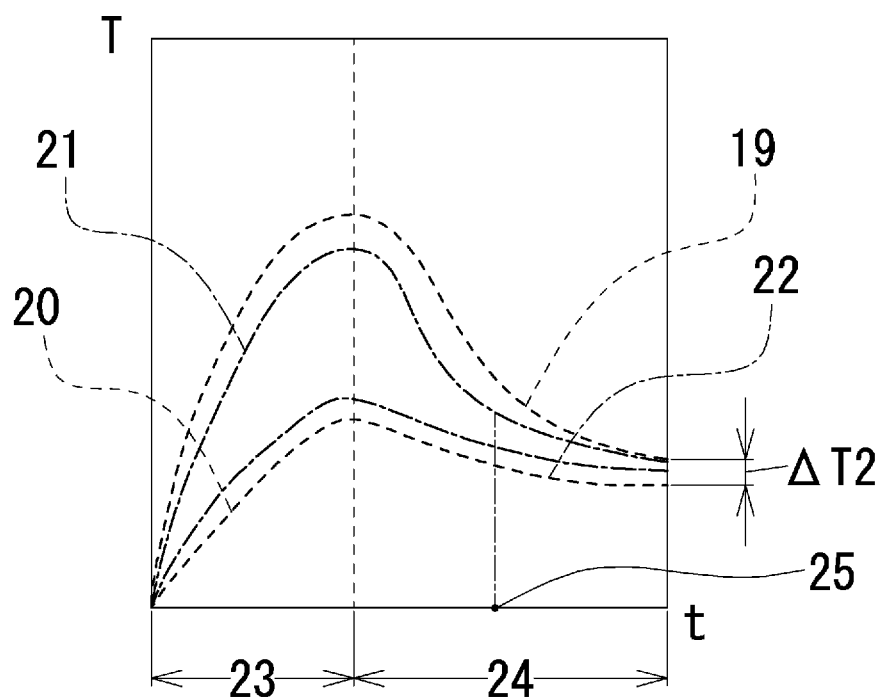

[Fig. 7]
(a) 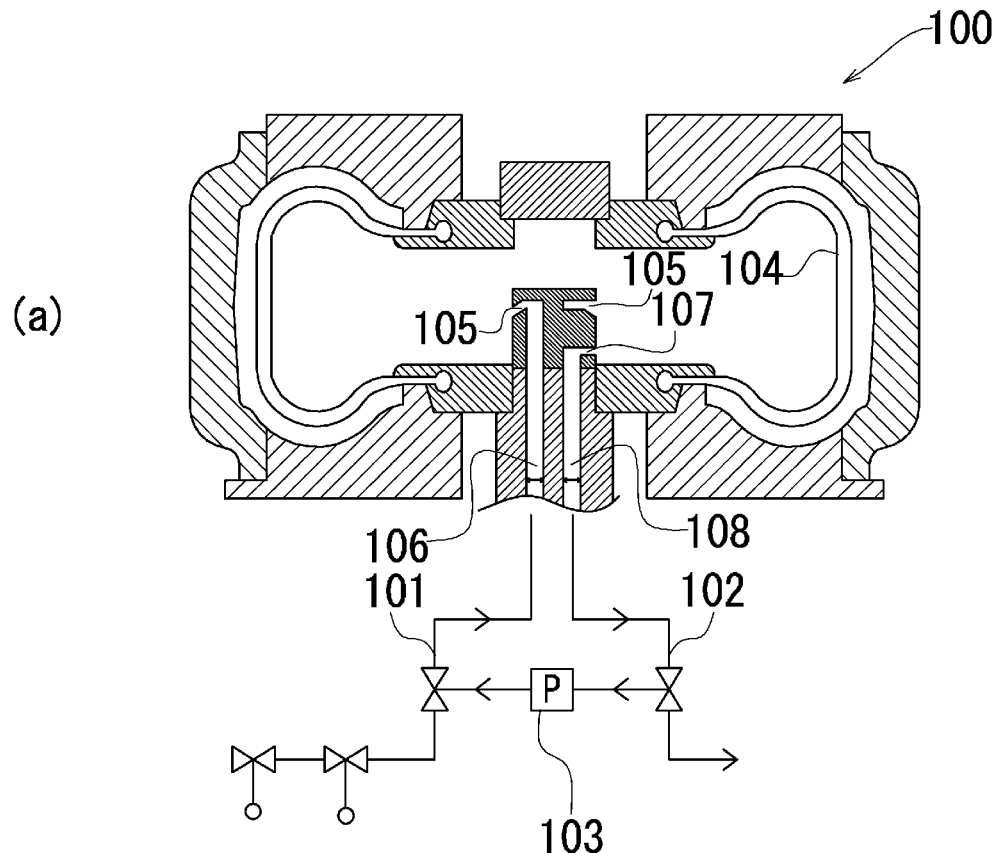
(b) 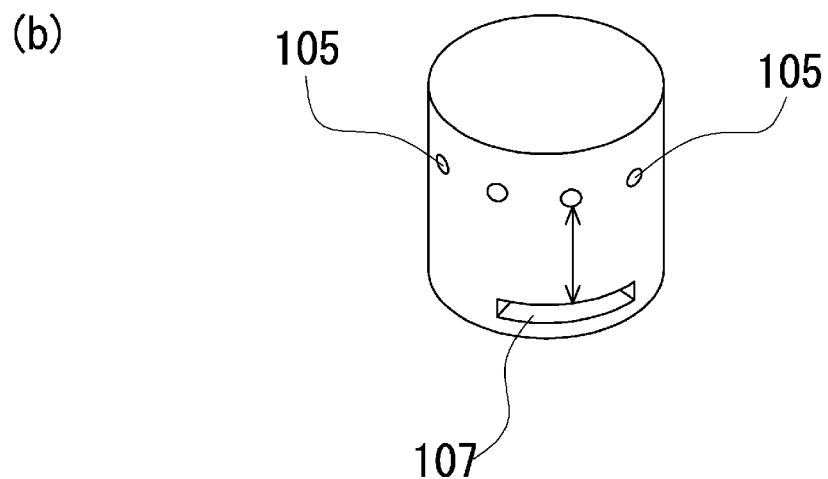
-- Prior Art --

[Fig. 8]
(a)            (b)
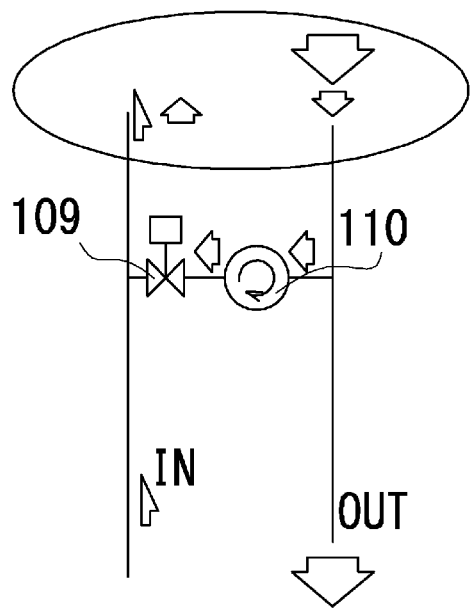 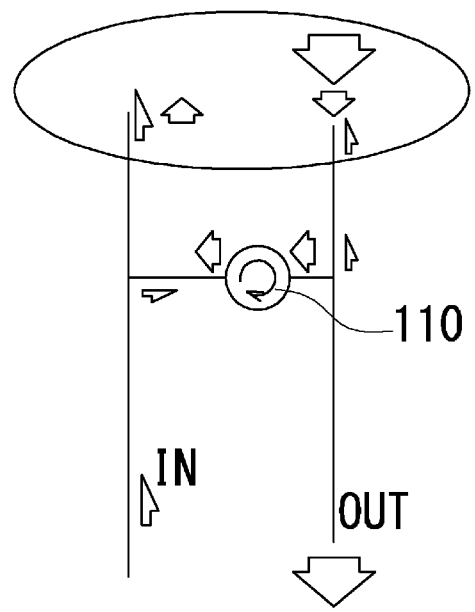
-- Prior Art --

PIPING STRUCTURE OF TIRE VULCANIZER, CIRCULATOR, AND METHOD FOR VULCANIZING TIRE WITH TIRE VULCANIZER

TECHNICAL FIELD

The present invention relates to a piping structure of a tire vulcanizer, a circulator, and a method for vulcanizing a tire with the tire vulcanizer. More particularly, the present invention relates to a piping structure of a tire vulcanizer, a circulator, and a method for vulcanizing a tire with the tire vulcanizer, which realize efficient tire vulcanization.

BACKGROUND ART

During a process of manufacturing a tire, a raw tire, which is molded to have a shape close to a finished product in advance, is put into a mold, and pressed and heated. In this case, vulcanization is performed by expanding a bladder provided in the mold, and bringing the bladder into close contact with an inner surface of the raw tire.

A vulcanizing medium such as steam or nitrogen is supplied into the bladder through a medium supply path, and the vulcanizing medium is discharged to the outside of the bladder through a medium discharge path.

For the vulcanization using the bladder, a method of circulating inert gas into the bladder by means of a fan, a method of forcibly circulating a heating and pressing medium by means of a pump, and the like are used in order to allow heat transfer to the raw tire to be uniformly performed.

However, in a case in which steam is supplied as a medium, there is a problem in that drain is collected at a lower side of the bladder, and a temperature difference occurs between upper and lower sides in the bladder during the vulcanization. A structure, which merely circulates the medium, cannot sufficiently cope with the temperature difference between the upper and lower sides of the bladder.

In a case in which a temperature distribution in the bladder is not uniform, there is concern that a difference in vulcanization degree between upper and lower sides of the raw tire occurs, and physical properties of rubber are imbalanced, which affects tire performance.

In addition, recently, in order to cope with higher performance of a tire such as a low fuel consumption tire or a run flat tire, a blending technology for uniform dispersion of a special mixture material in a rubber material has advanced. For this reason, there is a great need for a technique capable of uniformly vulcanizing the raw tire by improving a temperature difference between the upper and lower sides in the bladder as described above.

In this situation, a tire vulcanization apparatus, which tries to improve circulation efficiency of the medium such as steam, is present, and for example, a tire vulcanization apparatus disclosed in Patent Document 1 has been proposed.

Here, Patent Document 1 discloses a tire vulcanization apparatus 100 as illustrated in FIG. 7A. The tire vulcanization apparatus 100 has a medium supply path 101 for supplying a medium, a medium discharge path 102 for discharging the medium, and a circulator 103 for forcibly circulating the medium.

The medium supply path 101 has a plurality of injection ports 105 which is opened into a bladder 104, and a medium supply pipe 106 which extends in an up and down direction, and the injection ports 105 are provided at an upper portion of the medium supply pipe 106. In addition, the medium discharge path 102 has a recovery port 107 which is opened into the bladder 104, and a medium discharge pipe 108 which extends in the up and down direction, and the recovery port 107 is formed at an upper portion of the medium discharge pipe 108.

Further, the sum total of opening areas of the plurality of injection ports 105 is 10 to 50% of an internal piping cross-sectional area of the medium supply pipe 106, and an opening area of the recovery port 107 is larger than an internal piping cross-sectional area of the medium supply pipe 106 and an internal piping cross-sectional area of the medium discharge pipe 108.

In the tire vulcanization apparatus 100, by regulating the opening areas of the plurality of injection ports and the opening area of the recovery port, it is possible to increase a flow velocity of the vulcanizing medium to be injected into the bladder, and to set a flow velocity of the vulcanizing medium to be introduced into the recovery port to a low velocity. As a result, circulation efficiency of the medium in the bladder is improved. Further, FIG. 7B is a schematic perspective view illustrating a positional relationship between the injection ports 105 and the recovery port 107 of the apparatus.

PRIOR ART DOCUMENT

Patent Document 1: Japanese Patent Application Laid-Open No. 2013-159049

DISCLOSURE

Technical Problem

In the tire vulcanization apparatus disclosed in Patent Document 1, a valve is provided between the circulator and the medium supply path. The valve is a gate valve which serves to prevent a reverse flow of the medium from the medium supply path toward the circulator, but the gate valve and the circulator are operated at different timings.

That is, the supply of the medium into the bladder, which is caused by opening the gate valve, and the circulation of the medium caused by the circulator are performed at different timings. However, there is concern that the circulation of the medium caused by the circulator will be hindered by an opening and closing failure of the gate valve. Further, FIG. 8A illustrates a typical arrangement position of a gate valve 109 and a circulator 110 in tire vulcanization apparatus.

In addition, in consideration of the hindrance to the circulation of the medium, a tire vulcanization apparatus, which uses the circulator 110 without disposing the gate valve as illustrated in FIG. 8B, has been used from the related art. However, because there is no gate valve, there still remains a problem in that a reverse flow of the medium occurs from the medium supply path toward the circulator.

In addition, the tire vulcanization apparatus disclosed in Patent Document 1 has a problem in that an attempt to increase circulation efficiency by improving a portion for supplying the medium into the bladder, that is, a portion of the injection port cannot be compatible with a circulation effect of the medium caused by the circulator.

Specifically, as the injection port or the nozzle has a smaller diameter, the medium may be sent to a farther region in the bladder, and an effect of promoting convection of the medium is increased. Meanwhile, in the circulator, the circulation efficiency is improved as a diameter of a piping path in which the medium is circulated is increased.

For this reason, if a diameter of the injection port or the nozzle is decreased, there is a problem in that the efficiency of the circulation of the medium caused by the circulator deteriorates, and as a result, the installation of the circulator is less meaningful.

The present invention has been made in consideration of the aforementioned situations, and an object of the present invention is to provide a piping structure of a tire vulcanizer, a circulator, and a method for vulcanizing a tire with the tire vulcanizer, which realize efficient tire vulcanization.

Technical Solution

To achieve the aforementioned object, a piping structure of a tire vulcanizer according to the present invention includes: a medium supply path which communicates with an interior of a bladder for heating and pressing a raw tire, and supplies a high-temperature and high-pressure fluid into the bladder; a medium discharge path which communicates with the interior of the bladder, forms a circulation path for gas between the interior of the bladder and the medium discharge path, and discharges the gas to the outside; and a circulator which is provided on the medium discharge path, and circulates the gas in the circulation path when the raw tire is vulcanized by the bladder.

Here, the raw tire may be vulcanized by the bladder by means of the medium supply path which communicates with the interior of the bladder for heating and pressing the raw tire and supplies a high-temperature and high-pressure fluid into the bladder. Further, the high-temperature and high-pressure fluid disclosed herein is a vulcanizing medium that may be used for a process of vulcanizing the raw tire, and for example, the high-temperature and high-pressure fluid is steam or nitrogen gas.

In addition, with the medium supply path, which communicates with the interior of the bladder for heating and pressing the raw tire and supplies the high-temperature and high-pressure fluid into the bladder, and the medium discharge path which communicates with the interior of the bladder and discharges gas to the outside, it is possible to continuously supply and discharge the high-temperature and high-pressure fluid to and from the bladder. Further, the exterior disclosed herein means not only the exterior of the bladder, but also an outer side from the medium discharge path.

In addition, with the medium discharge path which may form the circulation path for gas between the medium discharge path and the interior of the bladder, it is possible to circulate the gas into the bladder. That is, it is possible to circulate gas in a region independent of the medium supply path. As a result, a diameter of an injection port for supplying the vulcanizing medium into the bladder may be small, and circulation efficiency of the circulator may be maintained.

In addition, with the circulator which is provided on the medium discharge path and circulates gas in the circulation path when the raw tire is vulcanized by the bladder, it is possible to circulate the gas in the bladder. In addition, since the circulator is disposed in the path different from the medium supply path, a reverse flow of the medium from the medium supply path may hardly occur.

In addition, in a case in which the medium discharge path includes at least two exhaust pipes, and a bypass pipe which communicates with the exhaust pipes, and the circulator is provided on the bypass pipe, gas may be circulated among the interior of the bladder, the exhaust pipes, and the bypass pipe.

In addition, in a case in which the circulator may switch a direction of the circulation of gas in the circulation path to a forward or reverse direction, it is possible to improve circulation efficiency by changing a flow of gas in the bladder.

In addition, to achieve the aforementioned object, a circulator is provided on a medium discharge path, which forms a circulation path for gas between the medium discharge path and an interior of a bladder for heating and pressing a raw tire and discharges the gas to the outside, and circulates the gas in the circulation path when the raw tire is vulcanized by the bladder.

Here, as the circulator is provided on the medium discharge path which may form the circulation path for gas between the medium discharge path and the interior of the bladder for heating and pressing the raw tire and may discharge the gas to the outside, it is possible to improve circulation efficiency by circulating the gas in the bladder.

In addition, to achieve the aforementioned object, a method of vulcanizing a tire with a tire vulcanizer according to the present invention includes: supplying a high-temperature and high-pressure fluid into a bladder for heating and pressing a raw tire; and circulating the gas in a circulation path for gas which is formed between a discharge path for gas and an interior of a bladder when the raw tire is vulcanized by the bladder.

Here, the raw tire may be vulcanized by the bladder by means of the process of supplying the high-temperature and high-pressure fluid into the bladder for heating and pressing the raw tire.

In addition, gas may be circulated in the bladder by the process of circulating the gas in the circulation path for gas formed between the discharge path for gas and the interior of the bladder when the raw tire is vulcanized by the bladder. In addition, since gas is circulated in the path different from the medium supply path, a reverse flow of the medium from the medium supply path may hardly occur.

Advantageous Effects

The piping structure of the tire vulcanizer according to the present invention is configured to realize efficient tire vulcanization.

In addition, the circulator of the present invention is configured to realize efficient tire vulcanization.

In addition, the method of vulcanizing a tire with the tire vulcanizer according to the present invention is configured to realize efficient tire vulcanization.

DESCRIPTION OF DRAWINGS

FIG. 1 is a schematic front view of a piping structure of a tire vulcanizer to which the present invention is applied.

FIG. 2 is a schematic side view of the piping structure of the tire vulcanizer to which the present invention is applied.

FIG. 3 is a schematic view of a peripheral structure of a supply port (FIG. 3A), a schematic view of a connection portion between an exhaust circulation path pipe and a bladder (FIG. 3B), and a schematic view of supply, discharge, and circulation paths for a vulcanizing medium (FIG. 3C).

FIG. 4 is a graph illustrating a change in temperature in upper and lower bladders when using a piping structure in the related art in which a diameter of a supply nozzle for supplying a vulcanizing medium into a bladder is small and a circulator is not used.

FIG. 5 is a graph illustrating a change in temperature in the upper and lower bladders when using the piping structure in the related art in which a diameter of the supply nozzle for supplying the vulcanizing medium into the bladder is a diameter that does not hinder the circulation of the medium caused by the circulator and the circulator is used.

FIG. 6 is a graph illustrating a change in temperature in upper and lower bladders when using an example of a piping structure of the present invention in which a diameter of a supply nozzle for supplying a vulcanizing medium into a bladder is small and a circulator is used.

FIG. 7 is a schematic view illustrating a piping structure of a tire vulcanizer in the related art.

FIG. 8 is a schematic view illustrating the piping structure of the tire vulcanizer in the related art.

BEST MODE

Hereinafter, an exemplary embodiment of the present invention will be described with reference to the drawings and used to understand the present invention.

FIG. 1 is a schematic front view of a piping structure of a tire vulcanizer to which the present invention is applied. FIG. 2 is a schematic side view of the piping structure of the tire vulcanizer to which the present invention is applied. Further, a structure to be described below is an example of the present invention, and the contents of the present invention are not limited thereto.

An example of the piping structure of the tire vulcanizer to which the present invention is applied has a central mechanism 1 of the tire vulcanizer as illustrated in FIG. 1. The central mechanism 1 has a bug head 2, a hydraulic cylinder 3, and exhaust circulation path pipes 4. In addition, the central mechanism 1 has a bladder (not illustrated) which may be expanded and contracted as a vulcanizing medium is supplied into the bladder.

The bug head 2 has a plurality of supply ports for the vulcanizing medium, and is disposed at an upper portion of the central mechanism 1. In addition, the hydraulic cylinder 3 is fixed at a lower portion of the bug head 2.

One end of the exhaust circulation path pipe 4 is connected to an interior of the bladder, and the two exhaust circulation path pipes 4 are connected to each other through a bypass pipe 5. The other end of the exhaust circulation path pipe 4 is connected to an exterior of the central mechanism 1. In addition, a circulator 6, which circulates the vulcanizing medium while maintaining pressure in the bladder, is provided in the bypass pipe 5.

The interior of the bladder, the exhaust circulation path pipes 4, and the bypass pipe 5 define a circulation path, and the vulcanizing medium may be circulated in the circulation path by the circulator 6 when a raw tire is vulcanized. In addition, after the vulcanization, the vulcanizing medium in the bladder flows toward the other end of the exhaust circulation path pipe 4, and then is discharged to the outside (see arrows indicated by symbol Z in FIG. 1).

In addition, the circulator 6 may switch a direction of a flow when the circulator 6 circulates the vulcanizing medium. Therefore, circulation efficiency may be changed accordingly.

A center post-rod 7 and a piston 8 are integrally disposed in the hydraulic cylinder 3. The center post-rod 7 and the piston 8 constitute a driving mechanism which is moved in the hydraulic cylinder 3 by a hydraulic operation and changes a height position of the central mechanism 1 during the process of vulcanizing the raw tire.

Here, the bug head 2 need not necessarily have the plurality of supply ports. However, the bug head 2 may particularly have the plurality of supply ports because a proper use is enabled in accordance with the types of vulcanizing media and general-purpose properties of the tire vulcanizer are increased.

In addition, the circulation path for the vulcanizing medium need not necessarily be configured by the two exhaust circulation path pipes 4, the bypass pipe 5, and the interior of the bladder, and it will be acceptable if the medium may be circulated at a position independent of a supply path for the vulcanizing medium and the vulcanizing medium may be discharged to the outside of the tire vulcanizer. In addition, for example, a structure in which the number of exhaust circulation path pipes 4 is increased or a structure in which a combination of the exhaust circulation path pipes 4 and the bypass pipe 5 is separately provided and connected may be adopted.

FIG. 2 illustrates a state of the central mechanism 1 illustrated in FIG. 1 when viewed in a direction rotated by about 90 degrees. As illustrated in FIG. 2, the central mechanism 1 has supply holes 10 provided in cylinder guides 9. The vulcanizing medium is supplied to the supply holes 10 from a non-illustrated vulcanizing medium supply source, and the vulcanizing medium is supplied to the supply ports of the bug head 2 through hoses.

The plurality of supply ports is provided in the bug head 2, such that the vulcanizing medium such as steam or nitrogen may be supplied into the bladder in accordance with the type of vulcanizing media.

FIG. 3 is a schematic view of a peripheral structure of the supply port (FIG. 3A), a schematic view of a connection portion between the exhaust circulation path pipe and the bladder (FIG. 3B), and a schematic view of supply, discharge, and circulation paths for the vulcanizing medium (FIG. 3C).

As illustrated in FIG. 3A, the vulcanizing medium is supplied to the supply ports 11 through the supply holes 10 in the cylinder guides 9 and the hoses. In addition, supply nozzles 12 are provided at portions where the bug head 2 is connected to the bladders. A diameter of the supply nozzle 12 is 2 mm, and as the diameter is decreased, an effect of promoting convection of the vulcanizing medium in the bladder is increased. Further, the arrows indicated by symbol Y in FIG. 3A indicate directions in which the vulcanizing medium is supplied.

As illustrated in FIG. 3B, a medium supply and discharge hole 13 and a medium supply and discharge hole 14 are formed at connection portions where the exhaust circulation path pipes 4 and the bladders are connected. The medium supply and discharge hole 13 and the medium supply and discharge hole 14 are portions that are intake ports in the discharge direction when the vulcanizing medium, which has been supplied into the bladder, is discharged toward the exhaust circulation path pipe 4. Further, the arrows indicated by symbol X in FIG. 3B indicate directions in which the vulcanizing medium is discharged when the vulcanizing medium is discharged.

In addition, when the circulator 6 circulates the vulcanizing medium in the bladder, the medium supply and discharge hole 13 a feeding port that supplies the medium, which flows through the bypass pipe 5 and the exhaust circulation path pipe 4, into the bladder. In addition, when the medium is discharged from the interior of the bladder toward the exhaust circulation path pipe 4, the medium supply and discharge hole 14 is an intake ports in the discharge direction.

As illustrated in FIG. 3C, there is a structure in which a supply path for the vulcanizing medium, which is indicated by reference numeral 15, and a circulation path indicated by reference numeral 16, are provided with respect to the bladder. When vulcanizing the raw tire, the vulcanizing medium is circulated by the circulator 6 in an arrow direction indicated by symbol C.

An effect in respect to temperatures of upper and lower portions of the bladder in a case in which the piping structure of the tire vulcanizer described above is used will be described.

FIG. 4 is a graph illustrating a change in temperature in upper and lower bladders when using a piping structure in the related art in which a diameter of a supply nozzle for supplying a vulcanizing medium into a bladder is small and a circulator is not used.

FIG. 5 is a graph illustrating a change in temperature in the upper and lower bladders when using the piping structure in the related art in which a diameter of the supply nozzle for supplying the vulcanizing medium into the bladder is a diameter that does not hinder the circulation of the medium caused by the circulator and the circulator is used.

FIG. 6 is a graph illustrating a change in temperature in upper and lower bladders when using an example of the piping structure of the present invention in which a diameter of the supply nozzle for supplying the vulcanizing medium into the bladder is small and the circulator is used.

FIGS. 4 to 6 are graphs in which a horizontal axis indicates the time (t), and a vertical axis indicates temperatures (T) of the upper bladder and the lower bladder. In addition, the respective graphs are illustrated for each set of the upper bladder and the lower bladder. In more detail, an upper bladder 17 and a lower bladder 18 are indicated by solid lines, an upper bladder 19 and a lower bladder 20 are indicated by dotted lines, and an upper bladder 21 and a lower bladder 22 are indicated by alternate long and short dashes lines. In addition, because drain is collected at the lower bladder, a temperature in the lower bladder is lower than that in the upper bladder.

As described above, regarding a temperature in the bladder, a temperature difference between the upper bladder and the lower bladder needs to be small when vulcanizing the raw tire. In a case in which a temperature difference between the upper and lower bladders is decreased in a short time, efficiency in vulcanizing the raw tire is improved, and quality of the finished tire is improved.

As illustrated in FIG. 4, in a case in which a small supply nozzle of which the nozzle diameter is about 2 mm is used without using the circulator, the vulcanizing medium may be vigorously blown to a position spaced apart from the nozzle in the bladder. As a result, for a predetermined time from the initiation of the vulcanization (in a region indicated by reference numeral 23), a temperature of the upper bladder 17 may be decreased, and a temperature of the lower bladder 18 may be increased, such that a temperature difference between the upper and lower bladders is decreased immediately after the initiation of the vulcanization (see symbol L1).

Meanwhile, in a region indicated by reference numeral 24 in FIG. 4, a temperature difference between the upper and lower bladders is gradually decreased, and in the latter part of the vulcanization process, the supply nozzle hardly affects the temperature difference. At a time at a right end in the graph, a temperature difference between the upper and lower bladders is $\Delta T1$.

In addition, in a case in which the circulator is used and a diameter of the supply nozzle is large to the extent to which the diameter does not hinder the circulation of the vulcanizing medium as illustrated in the graph in respect to the upper bladder 19 and the lower bladder 20 in FIG. 5, a temperature difference between the upper and lower bladders is not greatly decreased (see symbol L2) for a predetermined time from the initiation of the vulcanization (in a region indicated by reference numeral 23). Further, as a comparison object, FIG. 5 also illustrates a change in temperature of the upper bladder 17 and the lower bladder 18 illustrated in FIG. 4.

Further, in a region indicated by reference numeral 24 in FIG. 5, the circulator continuously circulates the vulcanizing medium in the bladder, such that a temperature of the upper bladder 19 is greatly decreased, and a temperature difference between the upper and lower bladders is quickly decreased. Further, at a time at a right end in the graph, a temperature difference between the upper and lower bladders is $\Delta T_2$, and a temperature difference is decreased ($\Delta T_1 > \Delta T_2$) in comparison with the piping structure used in FIG. 4.

FIG. 6 illustrates a result of using an example of the piping structure of the tire vulcanizer to which the present invention is applied. Further, as a comparison object, FIG. 6 also illustrates a change in temperature of the upper bladder 19 and the lower bladder 20 illustrated in FIG. 5.

In the central mechanism 1, a diameter of the supply nozzle 12 is small, and as illustrated in FIG. 4, a temperature difference between the upper and lower bladders is decreased in a process in the former part after the initiation of the vulcanization indicated by reference numeral 23. In addition, in a region indicated by reference numeral 24, a temperature of the upper bladder 21 is greatly decreased, and a temperature difference between the upper and lower bladders is quickly decreased, as illustrated in FIG. 5.

That is, in the piping structure of the tire vulcanizer to which the present invention is applied, a temperature difference between the interiors of the upper and lower bladders is efficiently decreased in the regions indicated by reference numerals 23 and 24, and reaches a portion indicated by reference numeral 25 at a temperature corresponding to $\Delta T_2$ in FIG. 5.

Since a temperature difference between the interiors of the upper and lower bladders is quickly decreased to a predetermined temperature difference, the time required to vulcanize the raw tire may be increased in a state in which temperatures in the upper and lower bladders are uniform. In particular, when forming a tire having a small tire diameter, such as a tire for a passenger vehicle, the time required to vulcanize a single tire is short, and as a result, it is possible to greatly improve qualities of the tire or efficiency in manufacturing the tire.

In addition, since the circulator is disposed in the path different from the supply path for the vulcanizing medium, a reverse flow of the vulcanizing medium from the supply path side does not occur.

As described above, the piping structure of the tire vulcanizer according to the present invention is configured to realize efficient tire vulcanization.

In addition, the circulator of the present invention is configured to realize efficient tire vulcanization.

In addition, the method of vulcanizing a tire with the tire vulcanizer of the present invention is configured to realize efficient tire vulcanization.

DESCRIPTION OF MAIN REFERENCE NUMERALS OF DRAWINGS

1: Central mechanism
2: Bug head
3: Hydraulic cylinder
4: Exhaust circulation path pipe
5: Bypass pipe
6: Circulator
7: Center post-rod
8: Piston
9: Cylinder guide
10: Supply hole
11: Supply port
12: Supply nozzle
13: Medium supply and discharge hole
14: Medium supply and discharge hole
15: Supply path for vulcanizing medium
16: Circulation path
17: Upper bladder
18: Lower bladder
19: Upper bladder
20: Lower bladder
21: Upper bladder
22: Lower bladder
23: Region indicating predetermined time from initiation of vulcanization
24: Region of vulcanization process
25: Portion where temperature difference between upper and lower bladders is $\Delta t_2$

The invention claimed is:

1. A piping structure of a tire vulcanizer, the piping structure comprising:
   a medium supply path which communicates with an interior of a bladder for heating and pressing a raw tire, and supplies a high-temperature and high-pressure fluid into the bladder;
   a medium discharge path which communicates with the interior of the bladder, and forms a circulation path for gas between the interior of the bladder and the medium discharge path, and discharges the gas to the outside; and
   a circulator which is provided on the medium discharge path, and circulates the gas in the circulation path when the raw tire is vulcanized by the bladder,
   wherein the medium discharge path includes exhaust pipes, and a bypass pipe connecting with the exhaust pipes,
   wherein the exhaust pipes discharge the gas to the outside,
   wherein the circulator is provided in the bypass pipe and wherein the circulator is not directly disposed in the medium supply path, and
   wherein the circulator switches a direction of the circulation of gas in the circulation path to a forward or reverse direction.

2. The piping structure of claim 1, the piping structure further comprising a supply nozzle connected to the bladder, wherein a diameter of the supply nozzle is up to 2 mm.

3. A circulator provided on a medium discharge path,
   wherein the circulator is provided in a bypass such that a circulation path for gas is formed between the medium discharge path and an interior of a bladder for heating and pressing a raw tire and for discharging the gas to the outside,
   wherein the circulator circulates the gas in the circulation path when the raw tire is vulcanized by the bladder, and
   wherein the medium discharge path includes exhaust pipes,
   wherein the bypass connects with the exhaust pipes,
   wherein the exhaust pipes discharge gas to the outside, and
   wherein the circulator is not directly disposed on a medium supply path,
   wherein the circulator is configured to switch a direction of the circulation path of gas from a first direction to a second direction and from the second direction to the first direction, and
   wherein the first direction is opposite to the second direction.

4. A method of vulcanizing a tire with a tire vulcanizer wherein the tire vulcanizer includes a piping structure, wherein the piping structure includes a medium discharge path which communicates with an interior of a bladder to form a circulation path for gas, and wherein the medium discharge path includes at least two exhaust pipes that discharge the gas outside, a circulator to circulate the gas, and a bypass pipe connecting with the at least two exhaust pipes and the circulator wherein the circulator is provided in the bypass pipe and wherein the circulator is not directly disposed on a medium supply path, the method comprising:
   supplying a high-temperature and high-pressure fluid into the bladder for heating and pressing a raw tire; and
   circulating the gas in the circulation path for the gas which is formed between the medium discharge path for the gas and the interior of the bladder when the raw tire is vulcanized by the bladder.

* * * * *